(12) United States Patent
Fox et al.

(10) Patent No.: US 11,630,917 B2
(45) Date of Patent: Apr. 18, 2023

(54) MANAGING ACCESS TO DATA FOR DEMOGRAPHIC REACH WITH ANONYMITY

(71) Applicant: INTERNATIONAL BUSINESS MACHINES CORPORATION, Armonk, NY (US)

(72) Inventors: Jeremy Fox, Georgetown, TX (US); Kelley Anders, East New Market, MD (US); Michael Hollinger, Austin, TX (US); Grant Miller, Arvada, CO (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 350 days.

(21) Appl. No.: 16/247,499

(22) Filed: Jan. 14, 2019

(65) Prior Publication Data
US 2020/0226287 A1 Jul. 16, 2020

(51) Int. Cl.
| | |
|---|---|
| *G06F 21/62* | (2013.01) |
| *H04L 9/40* | (2022.01) |
| *H04W 12/02* | (2009.01) |
| *G06F 21/60* | (2013.01) |

(52) U.S. Cl.
CPC ........ *G06F 21/6254* (2013.01); *G06F 21/604* (2013.01); *H04L 63/102* (2013.01); *H04L 63/105* (2013.01); *H04W 12/02* (2013.01)

(58) Field of Classification Search
CPC .. G06F 21/6254; G06F 21/604; G06F 21/602; H04L 63/102; H04L 63/105; H04L 63/0421; H04W 12/02
See application file for complete search history.

(56) References Cited

U.S. PATENT DOCUMENTS

| | | | |
|---|---|---|---|
| 5,884,272 | A | 3/1999 | Walker et al. |
| 6,073,241 | A | 6/2000 | Rosenberg et al. |
| 6,937,976 | B2 | 8/2005 | Apte |
| 8,935,757 | B2 | 1/2015 | Srinivasan et al. |
| 9,122,865 | B2 | 9/2015 | Ho et al. |
| 11,356,430 | B1* | 6/2022 | Kapczynski ............ H04L 63/08 |
| 2002/0103939 | A1 | 8/2002 | Fuehrer et al. |
| 2005/0044423 | A1* | 2/2005 | Mellmer ............... H04L 63/104 726/4 |
| 2005/0154913 | A1* | 7/2005 | Barriga ............... H04L 63/0815 726/4 |
| 2006/0195913 | A1 | 8/2006 | Popov et al. |
| 2007/0124584 | A1 | 5/2007 | Gupta |
| 2010/0212004 | A1 | 8/2010 | Fu |

(Continued)

OTHER PUBLICATIONS

Ferretti, L.; Marchetti, M.; and Colajanni, M.; "Verifiable Delegated Authorization for User-Centric Architectures and an OAuth2 Implementation," 2017 IEEE 41st Annual Computer Software and Applications Conference (COMPSAC), 2017, pp. 718-723, doi: 10.1109/COMPSAC.2017.260.*

(Continued)

*Primary Examiner* — Victor Lesniewski
(74) *Attorney, Agent, or Firm* — Griffiths & Seaton PLLC

(57) ABSTRACT

Embodiments for providing demographic reach with anonymity by a processor. User data access may be managed via a data access agent by generating a unique user privacy profile having a selected level of anonymity for each relationship between a user and an application service.

17 Claims, 9 Drawing Sheets

(56) References Cited

U.S. PATENT DOCUMENTS

| | | | |
|---|---|---|---|
| 2010/0251353 A1* | 9/2010 | Hodgkinson | H04L 63/0853 235/380 |
| 2010/0275009 A1* | 10/2010 | Canard | H04L 63/0823 713/155 |
| 2011/0055910 A1* | 3/2011 | Attanasio | H04L 63/304 726/6 |
| 2013/0318199 A1* | 11/2013 | Le Jouan | H04W 12/009 709/217 |
| 2014/0047551 A1* | 2/2014 | Nagasundaram | G06F 21/606 726/26 |
| 2014/0143886 A1* | 5/2014 | Eversoll | G06F 21/604 726/27 |
| 2015/0067341 A1 | 3/2015 | Deen et al. | |
| 2015/0095370 A1* | 4/2015 | Davidson | H04L 67/30 707/769 |
| 2016/0065541 A1* | 3/2016 | Winner | H04L 63/0815 726/6 |
| 2016/0283740 A1* | 9/2016 | Roundtree | H04L 63/104 |
| 2017/0132431 A1* | 5/2017 | Gonzalez Blanco | G06F 21/6254 |
| 2017/0169249 A1* | 6/2017 | de Oliveira | G06F 21/6245 |
| 2018/0004932 A1* | 1/2018 | Gray | G06F 21/45 |
| 2018/0144153 A1* | 5/2018 | Pead | G06F 21/6245 |
| 2019/0020653 A1* | 1/2019 | Brown | G06Q 30/0267 |
| 2019/0253431 A1* | 8/2019 | Atanda | G06F 21/62 |
| 2019/0319932 A1* | 10/2019 | Kandregula | H04L 67/20 |
| 2019/0362101 A1* | 11/2019 | Fisse | H04L 63/0421 |
| 2019/0377903 A1* | 12/2019 | Fagg | G06F 16/1834 |
| 2019/0394204 A1* | 12/2019 | Bansal | G06F 21/41 |
| 2020/0220948 A1* | 7/2020 | Stalter | B60W 50/08 |

OTHER PUBLICATIONS

Aa. Leiba, "Oauth web authorization protocol." IEEE Internet Computing 16.1 (2012): 74-77.

\* cited by examiner

MANAGING ACCESS TO DATA FOR DEMOGRAPHIC REACH WITH ANONYMITY

BACKGROUND OF THE INVENTION

Field of the Invention

The present invention relates in general to computing systems, and more particularly to, various embodiments for managing access to data for demographic reach with anonymity by a processor.

Description of the Related Art

In today's society, consumers, businesspersons, educators, and others communicate over a wide variety of mediums in real time, across great distances, and many times without boundaries or borders. The advent of computers and networking technologies have made possible the intercommunication of people from one side of the world to the other. Smartphones and other sophisticated devices that rest in the palm of a person's hand allow for the sharing of information between users in an increasingly user friendly and simple manner. The increasing complexity of society, coupled with the evolution of technology continue to engender the sharing of a vast amount of information between consumers, businesspersons, educators, and others. However, protecting the digital privacy of data such as, for example, personal data is of paramount importance.

SUMMARY OF THE INVENTION

Various embodiments for managing access to data for demographic reach with anonymity by a processor are provided. In one embodiment, by way of example only, a method for providing demographic reach with anonymity, again by a processor, is provided. User data access may be managed via a data access agent by generating a unique user privacy profile having a selected level of anonymity for each relationship between a user and an application service.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
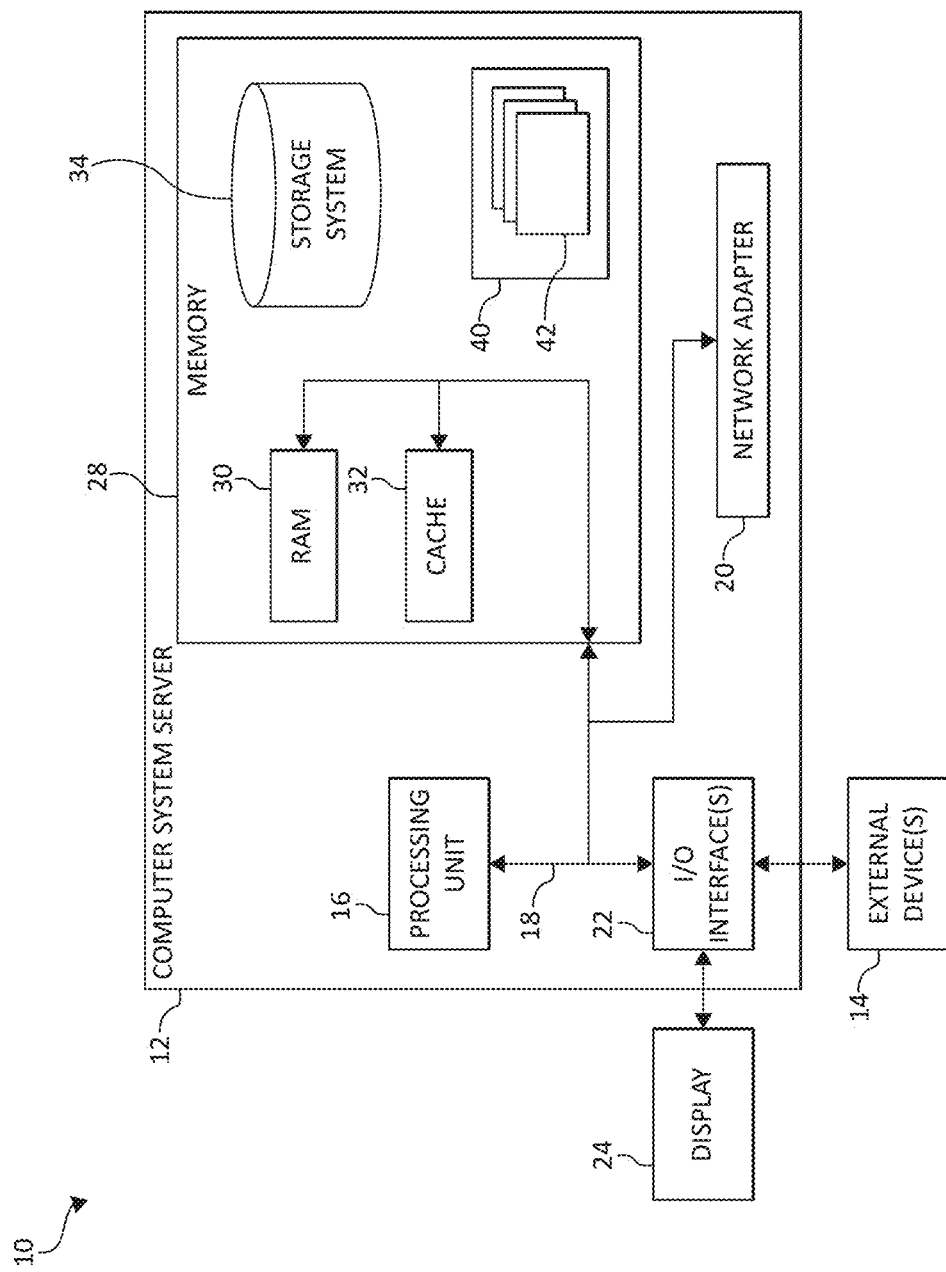
FIG. 1 is a block diagram depicting an exemplary cloud computing node according to an embodiment of the present invention.

With the increased globalization of various entities (e.g., users, organizations, and/or companies) and tendency for collaboration across different entities and geographically-bound jurisdictions, privacy issues have become a concern. This is particularly true where digital privacy breaches and abuses lead to identity theft and marketing abuse (e.g., spear phishing and spam). For example, with the increasing popularity of the Internet and the World Wide Web ("WWW"), it has become common to set up websites for advertising, marketing, and selling goods and services as well as providing product and other information and customer services. Examples for such websites are online stores for books, computers and other goods, websites providing information on the stock market, travel information or weather reports, and search engines and access to databases.

When doing business today, users must carefully manage which personal information they divulge, and to whom because users may unknowingly disclose information (e.g., personal data) they did not intent to. Some Internet/applications services offer the ability to add, for example, an alias (e.g., a "+" alias) for an address such as, for example, "myrealaddress+tickets@email.com" that allows the ability to post-process filter incoming messages. Similarly, disposable email addressing services enable a user to create disposable addresses, which may be deleted as needed. However, such services are unable to directly manage incoming and outgoing communications on a per-relationship basis. Further, many services across the web have adopted a single-sign-on approach, using various application identification "ID") (e.g., a social media ID or internet search engine ID). While this is easy for users, by signing in this way, users must carefully-review what data the service is granted about them on sign-in (e.g. name, email, friends list) and what rights are granted (e.g. "post on wall," "message friends"). Thus, a need exists to enable users to control their privacy data and duration a third party has access to user data to enhance digital privacy.

Accordingly, various embodiments are provided herein for managing access to data for demographic reach with anonymity. In aspect, by way of example only, user data access may be managed via a data access agent by generating a unique user privacy profile having a selected level of anonymity for each relationship between a user and an application service.

When signing on through single-sign-on ("SSO"), a user may be enabled to generate unique, anonymous contact details on a "per-relationship" basis. When manually signing up for a service (e.g., an application service), the user is also enabled to manage contact information shared on the per-relationship basis. For each relationship between the user and an application service a unique user privacy profile that contains a brokered, anonymous, or actual email address, name, phone, contact information (e.g., home/office address), other information identifying, or a combination thereof for the user may be generated. The generated contact information (e.g., the brokered, anonymous, or actual email address, name, phone, contact information, etc.) may be matched according to the user's acceptable unique user privacy profile as defined by a level of anonymity. The user may be provided and/or enable via the data access agent to control or selectively-revoke the generated profile. As an additional aspect, the end user (e.g., third party entity) may be required to perform a transaction agreement for "identity brokerage" services (e.g., pay for data access).

In this way, the present invention establishes a personal data access controlled service, having the ability to manage a data access agent (e.g., a cloud computing data access agent) yielding the ability to reach certain or selected demographical user groups and populations while the users maintain anonymity. User defined privacy and personal anonymity requirements of user(s) may be secured and upheld while enabling marketing reach to said user(s). Thus, the present invention provide for enables a user to dynamically control the user privacy levels for all personal information that was sent or managed in the past, present, and future, through a cloud-based data access agent establishing the ability to dynamically adjust the consent levels at will via a managed service.

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third-party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third-party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
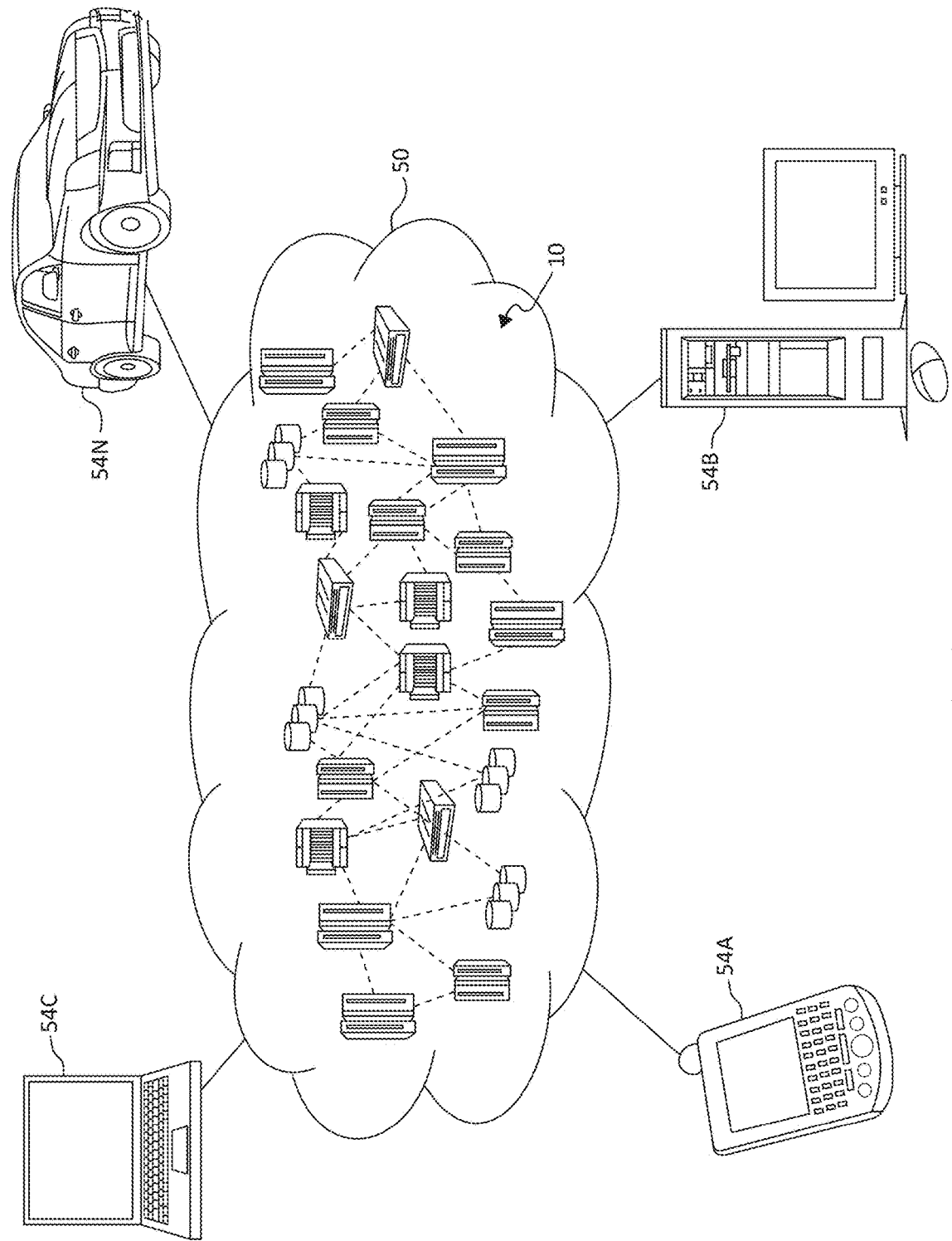
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
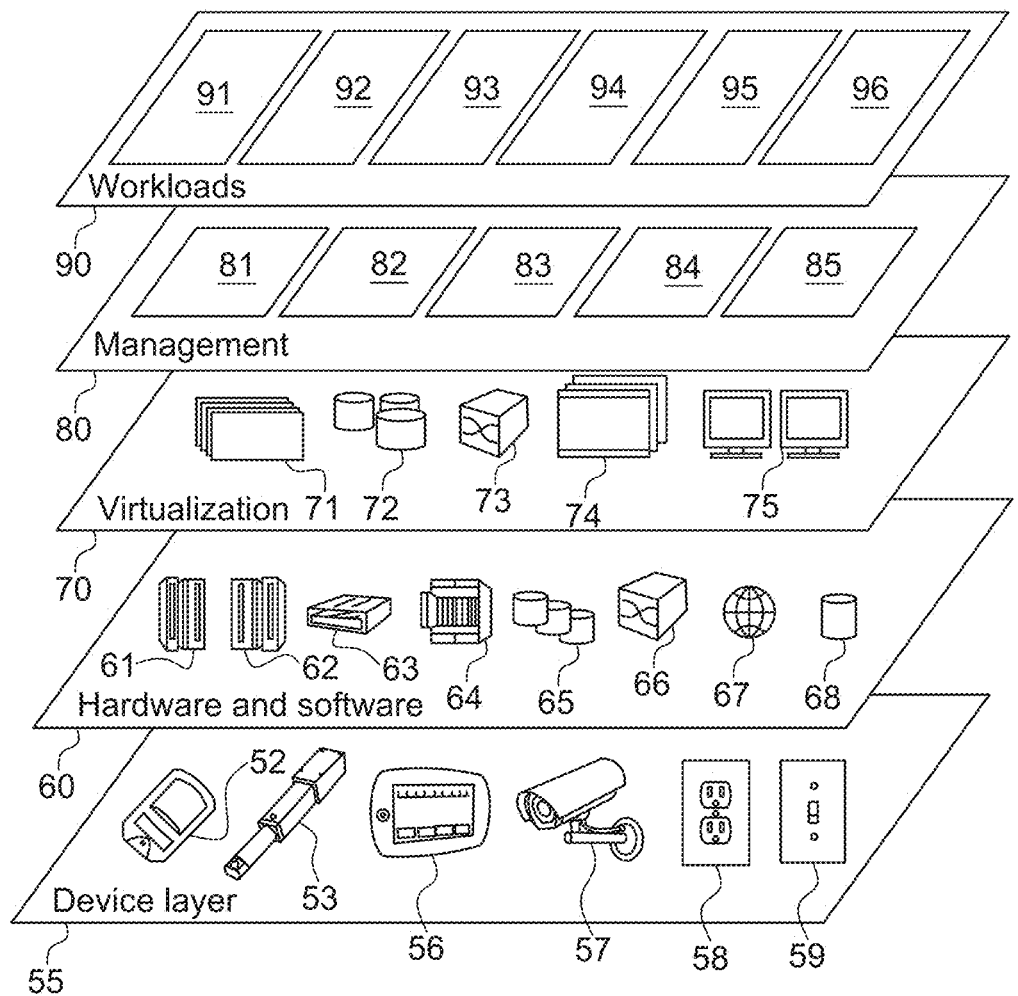
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing temporal access to data. In addition, workloads and functions 96 for managing access to data for demographic reach with anonymity may include such operations as data analytics, data analysis, and as will be further described, notification functionality. One of ordinary skill in the art will appreciate that the workloads and functions 96 for managing access to data for demographic reach with anonymity may also work in conjunction with other portions of the various abstraction layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for managing access to data for demographic reach with anonymity. These mechanisms include functionality that manages user data access via a data access agent by generating a unique user privacy profile having a selected level of anonymity for each relationship between a user and an application service.

The present invention provides for creating controlled access to personal information via a personal data access agent, enabling users to control access on a per-relationship basis. In this way, control is shifted away from third party data access agents and toward service providers (e.g., an email service) and individual users.

Figure 4:
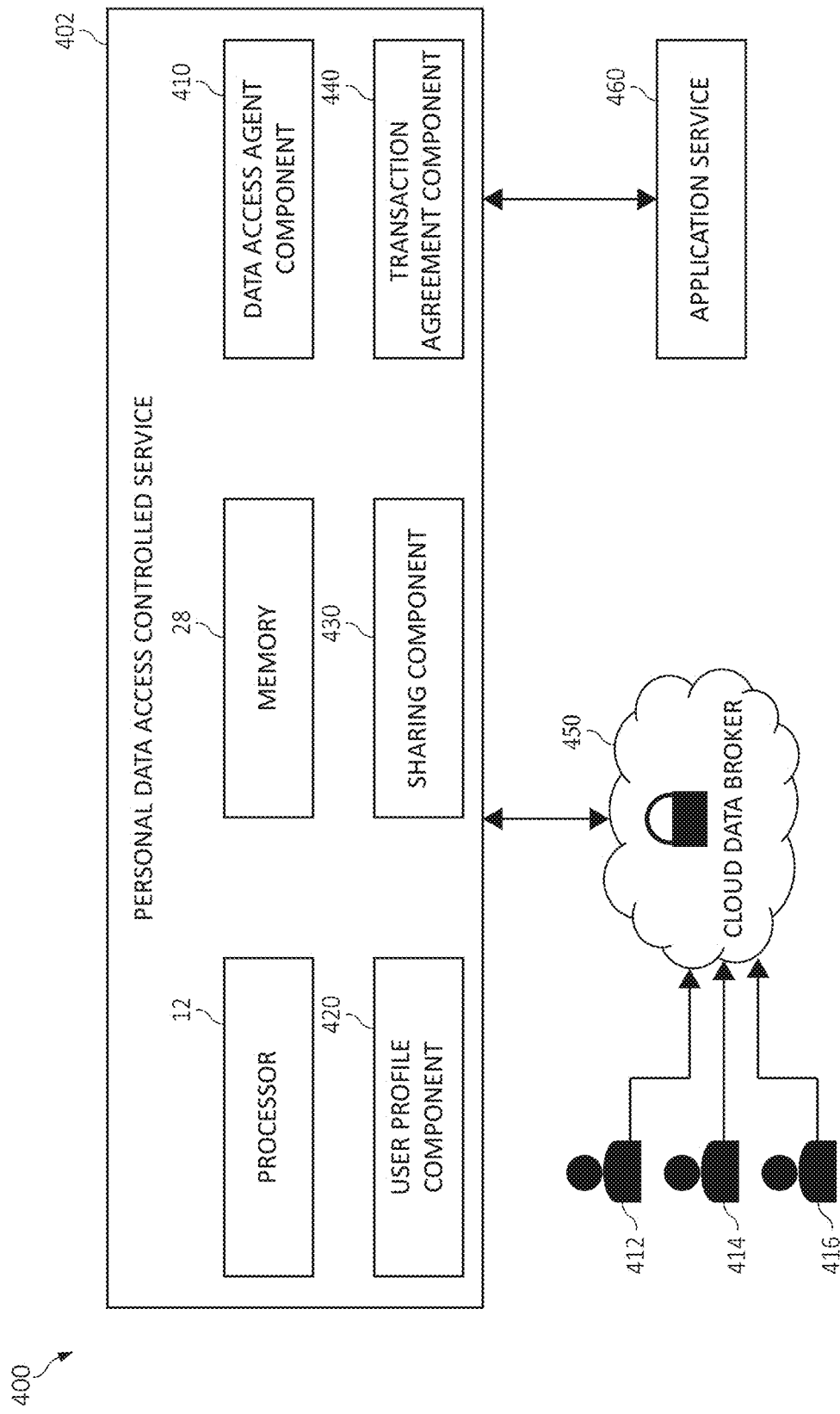
FIG. 4 is an additional block diagram depicting various user hardware and cloud computing components functioning in accordance with aspects of the present invention.

Turning now to FIG. 4, a block diagram depicting exemplary functional components 400 according to various mechanisms of the illustrated embodiments, is shown. As shown, the various functionality, or "modules" of functionality, hardware devices, and/or other components in the same descriptive sense as has been previously described in FIGS. 1-3 may be included in FIG. 4. For example, processing unit 12 and memory 28 of FIG. 1 may be employed in FIG. 4 to perform various computational, data processing, storage and other functionality in accordance with various aspects of the present invention.

The system 400 may include functional components such as a personal data access controlled service 402, having a data access agent component 410, a user profile component 420, a sharing component 430, a transaction agreement component 440, each of which may work in communication with each other. The personal data access controlled service 402 may be in communication with a cloud data access agent 450 (e.g., a cloud computing data access agent "cloud data access agent"). That is, the personal data access controlled service 402 may be included within the cloud data access agent 450 (e.g., data access agent service) and/or be located externally to the data access agent 450 for performing the functional components described herein.

The personal data access controlled service 402 may be in communication with a data access agent component 410 and/or one or more users 412, 414, and/or 416 (e.g., a computing device of the users 412). In one aspect, the personal data access controlled service 402 may be installed locally (e.g., internally) within the data access agent component 410 and/or located externally to the data access agent component 410.

The data access agent component 410, in association with the user profile component 420, may be used to harvest, collect, and store data of a user. The data access agent component 410 (e.g., a cloud computing data access agent "cloud data access agent") may continuously and automatically receive from the data access agent component 410.

The data access agent component 410 may manage user data access via a data access agent by generating a unique user privacy profile having a selected level of anonymity for each relationship between a user (e.g., user 412, 414, or 416) and an application service. The data access agent component 410 may define the selected level of anonymity to include an email, a name, contact data or a combination thereof and also determine a selected level of anonymity for the unique user privacy profile. The data access agent component 410 may dynamically control, adjust, or revoke access to each unique user privacy profile for each user such as, for example, user 412, 414, and/or 416. The data access agent component 410 may generate a brokered, anonymous, or actual email, name, demographic, contact data or a combination thereof for the unique user privacy profile according to the selected level of anonymity.

Each unique user privacy profile for each relationship (e.g., relationship between each user and each application) may be generated, stored, and/or maintained in the user profile component 420.

The sharing component 430 may share the unique user privacy profile with the application service according to the selected level of anonymity.

The transaction agreement component 440 may require a transaction agreement for managing the user data access via the data access agent 450. That is, a transaction agreement via transaction agreement component 440 (e.g., a financial payment, a virtual currency transaction, etc.) may be arranged for accessing the unique user privacy profile. The personal data may be stored in, maintained by, and/or accessed from the user profile component 420 (e.g., an online accessible location) which may be made available upon negotiating a transaction agreement (e.g., access upon agreement of payment terms). It should be noted that a transaction agreement (e.g., a monetary exchange) may include exchanging various forms of value, including coins, currency, credit, debit, digital currency, and/or bank account funds, for prepaid cash cards, credit cards, phone cards, goods and services, and the like. Moreover, monetary exchange may include a virtual currency transaction (e.g., digital currency transactions such as, for example, Bitcoin transactions.

Figure 5A:
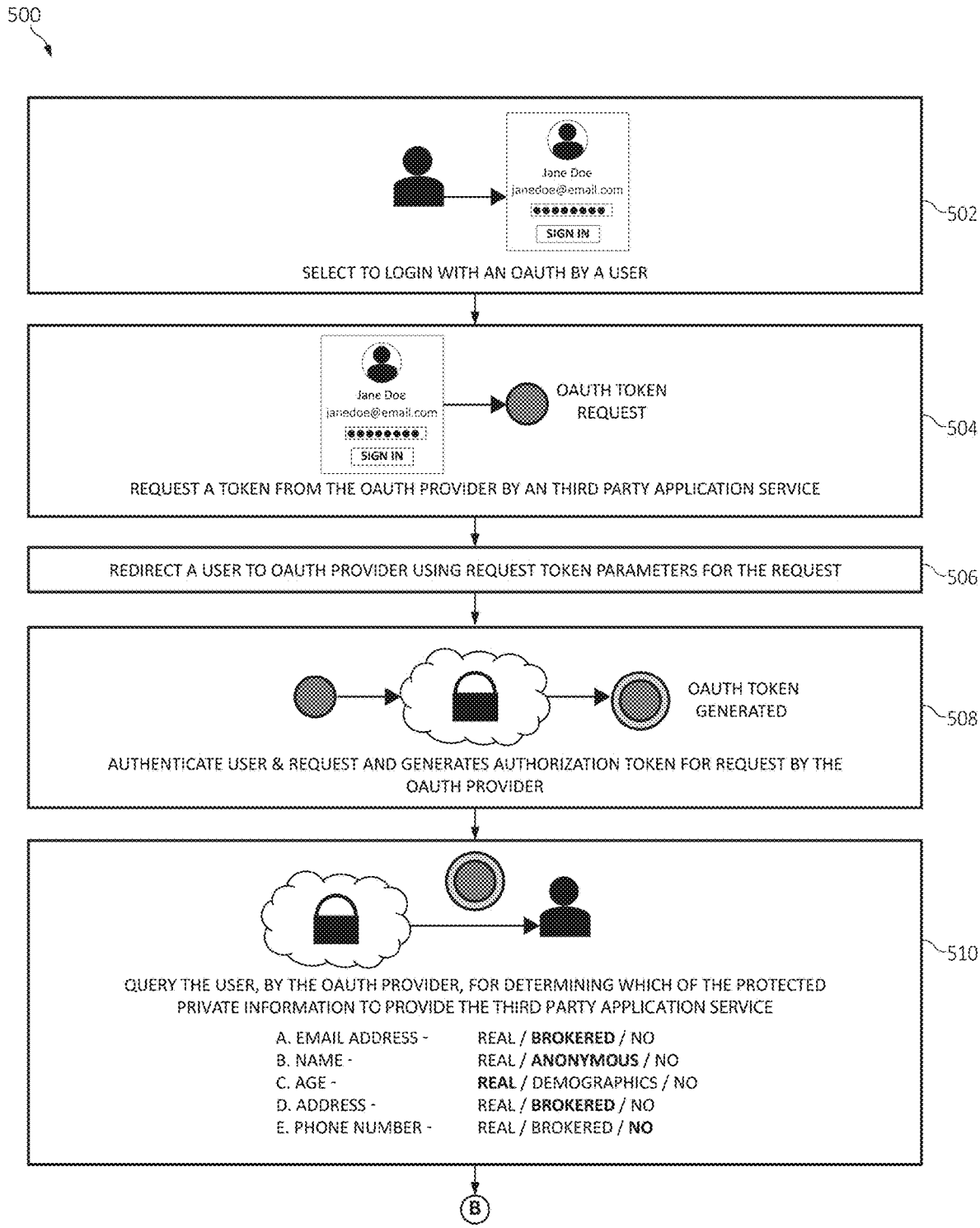
FIGS. 5A-5C is an additional block diagram depicting an operation for managing access to data for demographic reach with anonymity using a single sign-on into an application in which various aspects of the present invention may be realized.
Figure 5B:
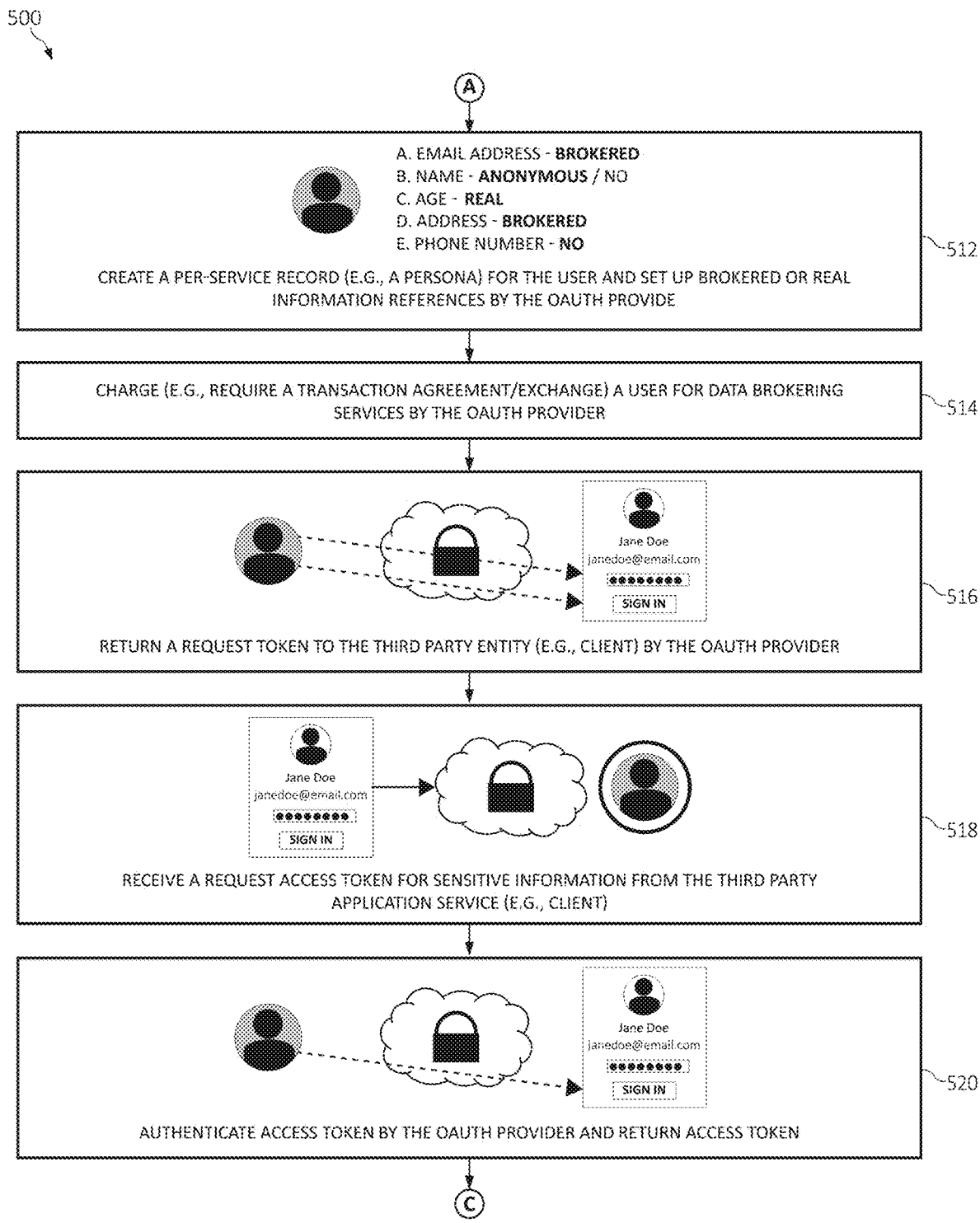
Figure 5C:
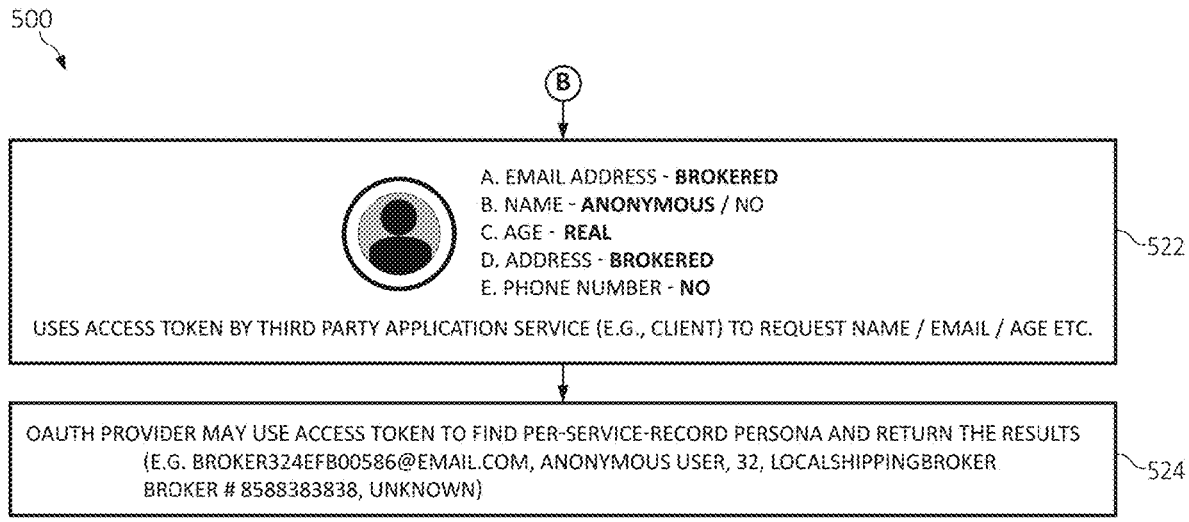
Figure 6:
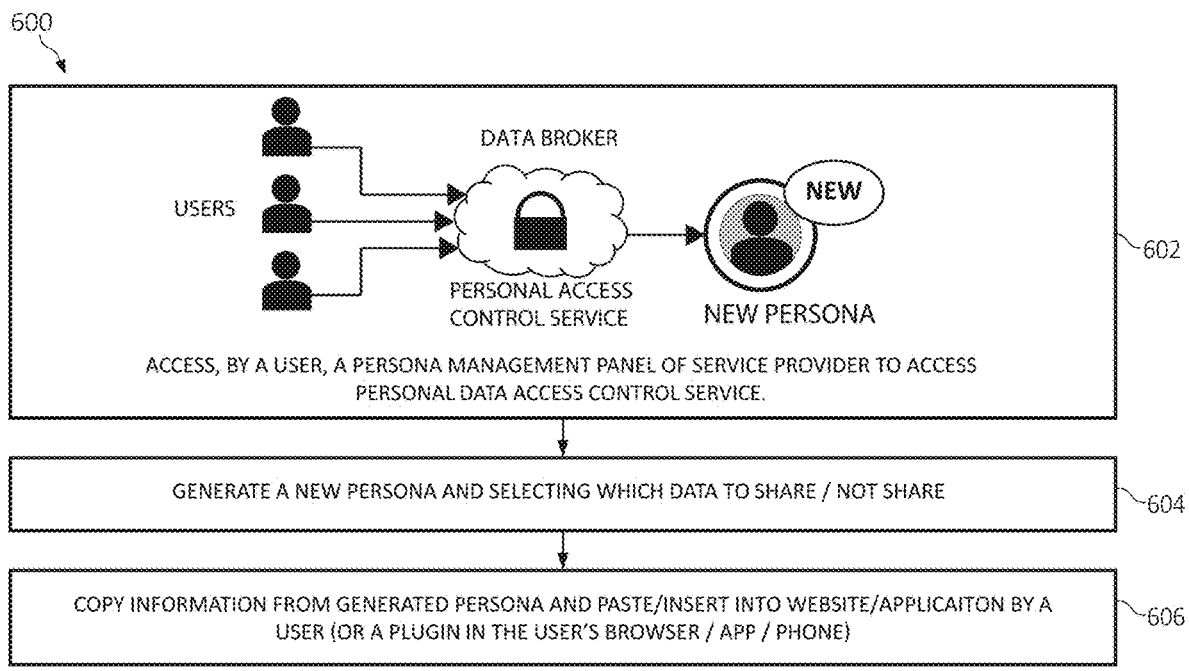
FIG. 6 is an additional block diagram depicting an operation for managing access to data for demographic reach with anonymity by manual signing into an application in which various aspects of the present invention may be realized.
Figure 7:
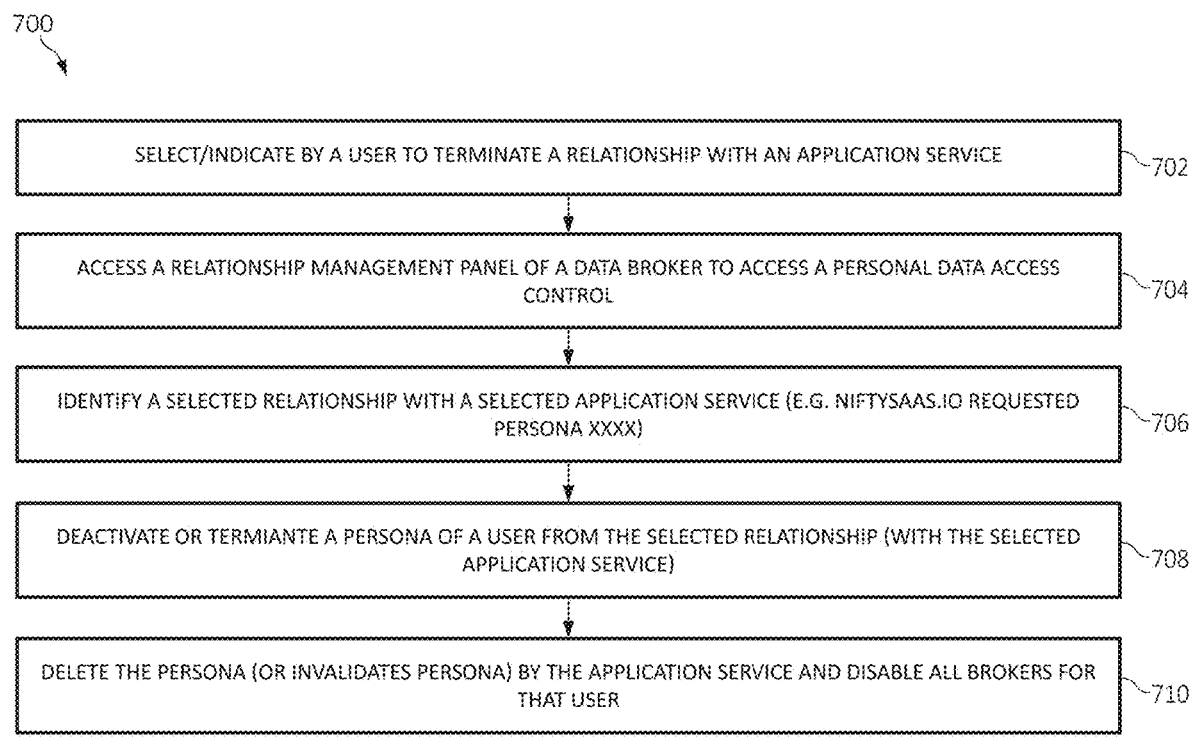
FIG. 7 is an additional block diagram depicting an operation for managing access to data for demographic reach with anonymity by manual signing into an application in which various aspects of the present invention may be realized.

In view of the above use case example, consider, as illustrations of exemplary functional operations to accomplish various purposes of the present invention, FIGS. 5-7, following.

Turning now to FIGS. 5A-5C, is additional block-flow diagram depicting an operation for managing access to data for demographic reach with anonymity using a single sign-on ("SSO") into an application is depicted. As shown, the various blocks of functionality are depicted with arrows designating the blocks' 500 relationships with each other and to show process flow. Additionally, descriptive information is also seen relating each of the functional blocks 500. As will be seen, many of the functional blocks may also be considered "modules" or "components" of functionality, in the same descriptive sense as has been previously described in FIGS. 1-4. With the foregoing in mind, the module blocks 500 may also be incorporated into various hardware and software components of a system for image enhancement in accordance with the present invention. Many of the functional blocks 500 may execute as background processes on various components, either in distributed computing components, or on the user device, or elsewhere, and generally unaware to the user performing generalized tasks. In one aspect, the functional blocks 500 may be implemented as a method executed as instructions on a machine, where the instructions are included on at least one computer readable medium or one non-transitory machine-readable storage medium.

The functionality 500 may start in block 502 with a user selecting to login with an open authorization ("OAuth) (e.g., login to internet search engine provider service). An OAuth is an open standard for token-based authentication and authorization on the Internet. OAuth allows an end user's account information to be used by third-party services without exposing the user's password such as, for example, an email of Jane Doe ("janedoe@email.com").

In block 504, a token may be requested from the OAuth provider (e.g., email service, or third party authorization service) by a third party service (e.g., an application service). For example, the OAuth provider verifies the third-party service is authentic and returns to the third-party service a "request token" (e.g., a SimpleExampleSaas.io requests an authentication token for a selected user).

In block 506, a user may be redirected to the OAuth provider using request token parameters. The OAuth provider authenticates a user and a request and generates an authorization token for the request, as in block 508.

The OAuth provider may query the user to determine which of the protected private information included in a unique user privacy profile may be provided and shared to the third-party service, as in block 510. For example, the user may indicate as follows. A) An email address may be 1) a real email, 2) a brokered email, and/or 3) an anonymous or no email that is to be provided. B) A name may be 1) a real name, 2) a brokered name, and/or 3) an anonymous or no name that is to be provided. C) An age may be 1) a real age, 2) a brokered age, and/or 3) an anonymous or no age (and/or demographics) that is to be provided. D) An address may be 1) a real address, 2) a brokered address, and/or 3) an anonymous or no address that is to be provided. E) A phone number may be 1) a real phone number, 2) a brokered phone number, and/or 3) an anonymous or no phone number that is to be provided.

In block 512, the OAuth provider may create a per-service record (e.g., a persona) for the user and set up brokered or real information references. The OAuth provider may also charge (e.g., require a transaction agreement/exchange) the user for data access agent services, as in block 514. Thus, as illustrated in FIGS. 5A-5C, the data access agent may provide, for example, a brokered email address, an anonymous name, a real age, a brokered address, and no phone number.

In block 516, the OAuth provider may return a request token to the third party entity (e.g., client). The client may receive a request access token for sensitive information from the third party application service (e.g., client), as in block 518. The OAuth provider may authenticate the access token and return the request access token, as in block 520. The client may use the access toke by the third party application service (e.g., client) to request a name, email, age, etc., of the user (e.g., the brokered email address, the anonymous name, the real age, the brokered address, and no phone number), as in block 522.

The OAuth provider may use the access token to find/identify/locate the per-service-record persona and return the results (e.g., broker324efb00586@email.com, Anonymous User, 32, LocalShippingBroker BROKER #8588383838, Unknown), as in block 524.

Turning now to FIG. 6, an additional block-flow diagram depicting an operation for managing access to data for demographic reach with anonymity by manual signing into an application is depicted. As shown, the various blocks of functionality are depicted with arrows designating the blocks' 600 relationships with each other and to show process flow. Additionally, descriptive information is also seen relating each of the functional blocks 600. As will be seen, many of the functional blocks may also be considered "modules" or "components" of functionality, in the same descriptive sense as has been previously described in FIGS. 1-4. With the foregoing in mind, the module blocks 600 may also be incorporated into various hardware and software components of a system for image enhancement in accordance with the present invention. Many of the functional blocks 600 may execute as background processes on various components, either in distributed computing components, or on the user device, or elsewhere, and generally unaware to the user performing generalized tasks. In one aspect, the functional blocks 600 may be implemented as a method executed as instructions on a machine, where the instructions are included on at least one computer readable medium or one non-transitory machine-readable storage medium.

The functionality 600 may start in block 602 with a user accessing a persona management panel of service provider (e.g., data access agent) to access a personal data access control service. A user, via a cloud data access agent/personal access control service, may generate a new persona and indicating which data to share or not share, as in block 604. The information from the generated persona may be copied for the user and pasted and/or shared into an application service (e.g., an application and/or website), as in block 606.

It should be noted that when a message arrives (e.g., via email) to the brokered address, the data access agent service (e.g., the personal data access controlled service 402 of FIG. 4) may authenticate that the persona record is still active. If the persona record is still active, the persona records may be shared and/or forward to the third party entity. If a third party entity attempts to use an invalid brokered address, the service (e.g., email) rejects the address as invalid.

FIG. 7 is an additional block diagram depicting an operation for managing access to data for demographic reach with anonymity by manual signing into an application. The functionality 700 may be implemented as a method executed as instructions on a machine, where the instructions are included on at least one computer readable medium or one non-transitory machine-readable storage medium.

The functionality 700 may start in block 702 with a user selecting to terminate a relationship with an application service. The user may access a relationship management panel of a data access agent to access a personal data access control service, as in block 704. A selected relationship with a selected application service may be identified (e.g. "SimpleExampleSaas.io" requested persona "XXXX"), as in block 706. A persona of a user may be deactivated and/or terminated from the selected relationship (with the selected application service), as in block 708. The application service may delete the persona (or invalidates persona) and disable all brokers for that user, as in block 710.

Figure 8:
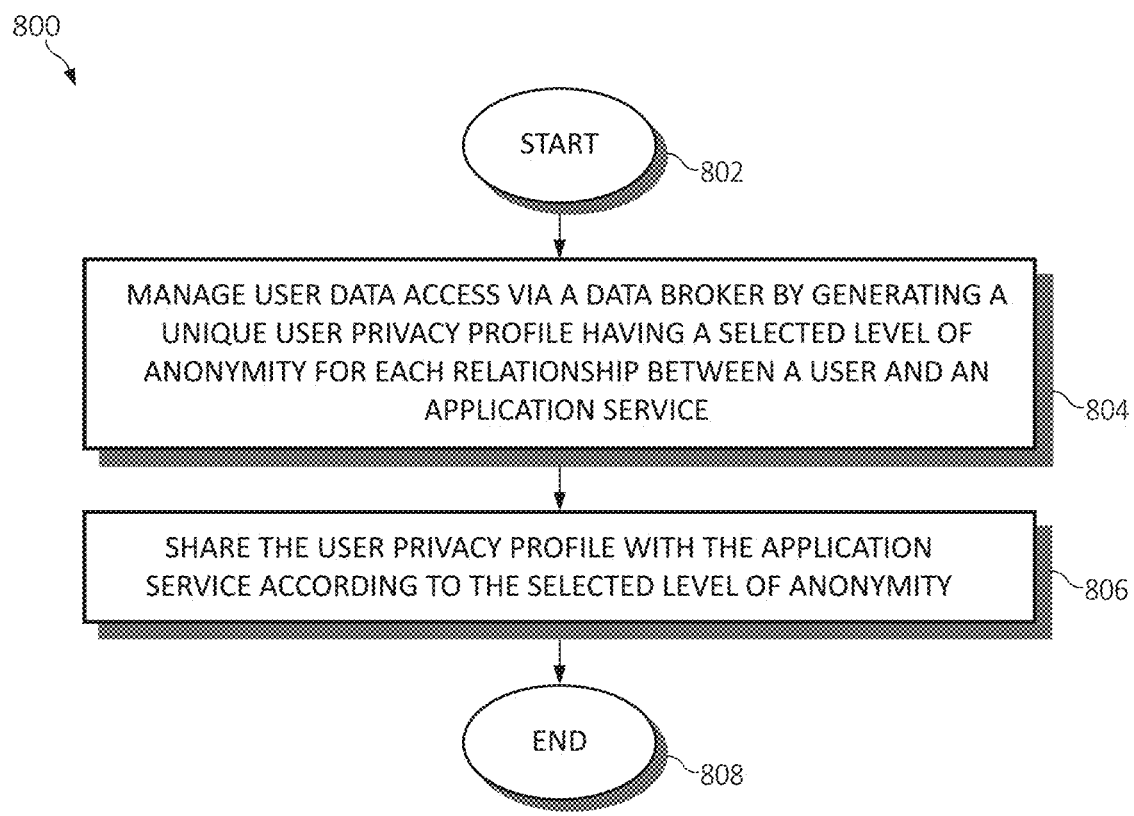
FIG. 8 is a flowchart diagram depicting an additional exemplary method for managing access to data for demographic reach with anonymity, again in which various aspects of the present invention may be realized.

Turning now to FIG. 8, a method 800 for managing access to data for demographic reach with anonymity by a processor is depicted, in which various aspects of the illustrated embodiments may be implemented. The functionality 800 may be implemented as a method executed as instructions on a machine, where the instructions are included on at least one computer readable medium or one non-transitory machine-readable storage medium.

The functionality 800 may start in block 802. User data access may be managed via a data access agent by generating a unique user privacy profile having a selected level of anonymity for each relationship between a user and an application service, as in block 804. The unique user privacy profile may be shared with the application service according to the selected level of anonymity, as in block 806. The functionality may end, as in block 808.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for providing demographic reach with anonymity by a processor, comprising:

managing user data access via a data access agent by generating a unique user privacy profile having a selected level of anonymity for each relationship between a user and an application service, wherein the unique user privacy profile having the selected level of anonymity is generated as a persona of the user for each of a plurality of services accessed under a single sign-on (SSO) authentication scheme used to access the application service such that the data access agent brokers user record information at the selected level of anonymity for each of the plurality of services notwithstanding the user accesses the plurality of services under the SSO authentication scheme, and wherein generating the unique user privacy profile includes:
  receiving a selection by the user to login with an open authorization (OAuth) provider,
  receiving, by a third-party service provider, a request token from the OAuth provider upon the OAuth provider verifying the third-party service provider is authentic,
  redirecting the user to the OAuth provider using request token parameters,
  authenticating, by the OAuth provider, the user and the request token,
  generating, by the OAuth provider, an authorization token for the request token responsive to the authenticating,
  querying, by the OAuth provider, the user to determine user information to be shared with the third-party service provider according to the selected level of anonymity,
  creating, by the OAuth provider, a per-service record for the user comprising the persona, and
  initiating brokering, by the OAuth provider, of the user information to be shared with the third-party service provider according to the persona;

in conjunction with managing the user data access, providing a single interface listing each persona of the unique user privacy profile and the selected level of anonymity thereof, wherein the user selectively approves and revokes the unique user privacy profile from being accessed by respective services of the application services using the single interface, and wherein accessing the unique user privacy profile by the respective services includes sending the request token, by the respective services to the data access agent requesting access to the unique user privacy profile, authenticating the request token and locating the user using information contained in the request token by the data access agent, and returning the unique user privacy profile to the respective services by the data access agent upon locating the user such that the user information of the user is not shared with the respective services until the data access agent receives and authenticates the request token sent from the respective services; and in conjunction with providing the single interface and the selectively revoking of the unique user privacy profile, terminating a selected relationship between the user and the application service by selecting a respective persona on listing of the single interface and deactivating the respective persona within the data access agent, wherein, upon deactivating the respective persona on the single interface, the data access agent deletes the respective persona and disables any brokering of the user record information.

2. The method of claim 1, further including determining the selected level of anonymity for the unique user privacy profile.

3. The method of claim 1, further including defining the selected level of anonymity to include an email, a name, contact data or a combination thereof.

4. The method of claim 1, further including generating a brokered, anonymous, or actual email, name, demographic, contact data or a combination thereof for the unique user privacy profile according to the selected level of anonymity.

5. The method of claim 1, further including sharing the unique user privacy profile with the application service according to the selected level of anonymity.

6. The method of claim 1, further including requiring a transaction agreement for managing the user data access via the data access agent.

7. A system for providing demographic reach with anonymity, comprising:
one or more computers with executable instructions that when executed cause the system to:
manage user data access via a data access agent by generating a unique user privacy profile having a selected level of anonymity for each relationship between a user and an application service, wherein the unique user privacy profile having the selected level of anonymity is generated as a persona of the user for each of a plurality of services accessed under a single sign-on (SSO) authentication scheme used to access the application service such that the data access agent brokers user record information at the selected level of anonymity for each of the plurality of services notwithstanding the user accesses the plurality of services under the SSO authentication scheme, and wherein generating the unique user privacy profile includes:
receiving a selection by the user to login with an open authorization (OAuth) provider,
receiving, by a third-party service provider, a request token from the OAuth provider upon the OAuth provider verifying the third-party service provider is authentic,
redirecting the user to the OAuth provider using request token parameters,
authenticating, by the OAuth provider, the user and the request token,
generating, by the OAuth provider, an authorization token for the request token responsive to the authenticating,
querying, by the OAuth provider, the user to determine user information to be shared with the third-party service provider according to the selected level of anonymity,
creating, by the OAuth provider, a per-service record for the user comprising the persona, and
initiating brokering, by the OAuth provider, of the user information to be shared with the third-party service provider according to the persona;
in conjunction with managing the user data access, provide a single interface listing each persona of the unique user privacy profile and the selected level of anonymity thereof, wherein the user selectively approves and revokes the unique user privacy profile from being accessed by respective services of the application services using the single interface, and wherein accessing the unique user privacy profile by the respective services includes sending the request token, by the respective services to the data access agent requesting access to the unique user privacy profile, authenticating the request token and locating the user using information contained in the request token by the data access agent, and returning the unique user privacy profile to the respective services by the data access agent upon locating the user such that the user information of the user is not shared with the respective services until the data access agent receives and authenticates the request token sent from the respective services; and
in conjunction with providing the single interface and the selectively revoking of the unique user privacy profile, terminating a selected relationship between the user and the application service by selecting a respective persona on listing of the single interface and deactivating the respective persona within the data access agent, wherein, upon deactivating the respective persona on the single interface, the data access agent deletes the respective persona and disables any brokering of the user record information.

8. The system of claim 7, wherein the executable instructions determine the selected level of anonymity for the unique user privacy profile.

9. The system of claim 7, wherein the executable instructions define the selected level of anonymity to include an email, a name, contact data or a combination thereof.

10. The system of claim 7, wherein the executable instructions generate a brokered, anonymous, or actual email, name, demographic, contact data or a combination thereof for the unique user privacy profile according to the selected level of anonymity.

11. The system of claim 7, wherein the executable instructions share the unique user privacy profile with the application service according to the selected level of anonymity.

12. The system of claim 7, wherein the executable instructions require a transaction agreement for managing the user data access via the data access agent.

13. A computer program product for, by a processor, providing demographic reach with anonymity, the computer program product comprising a non-transitory computer-readable storage medium having computer-readable program code portions stored therein, the computer-readable program code portions comprising:
an executable portion that manages user data access via a data access agent by generating a unique user privacy profile having a selected level of anonymity for each relationship between a user and an application service, wherein the unique user privacy profile having the selected level of anonymity is generated as a persona of the user for each of a plurality of services accessed under a single sign-on (SSO) authentication scheme used to access the application service such that the data access agent brokers user record information at the selected level of anonymity for each of the plurality of services notwithstanding the user accesses the plurality of services under the SSO authentication scheme, and wherein generating the unique user privacy profile includes:
receiving a selection by the user to login with an open authorization (OAuth) provider,
receiving, by a third-party service provider, a request token from the OAuth provider upon the OAuth provider verifying the third-party service provider is authentic, redirecting the user to the OAuth provider using request token parameters, authenticating, by the OAuth provider, the user and the request token, generating, by the OAuth provider, an authorization token for the request token responsive to the authenticating, querying, by the OAuth provider, the user to determine user information to be shared with the third-party service provider according to the selected level of anonymity, creating, by the OAuth provider, a per-service record for the user comprising the persona, and initiating brokering, by the OAuth provider, of the user information to be shared with the third-party service provider according to the persona;

an executable portion that, in conjunction with managing the user data access, provides a single interface listing each persona of the unique user privacy profile and the selected level of anonymity thereof, wherein the user selectively approves and revokes the unique user privacy profile from being accessed by respective services of the application services using the single interface, and wherein accessing the unique user privacy profile by the respective services includes sending the request token, by the respective services to the data access agent requesting access to the unique user privacy profile, authenticating the request token and locating the user using information contained in the request token by the data access agent, and returning the unique user privacy profile to the respective services by the data access agent upon locating the user such that the user information of the user is not shared with the respective services until the data access agent receives and authenticates the request token sent from the respective services; and an executable portion that, in conjunction with providing the single interface and the selectively revoking of the unique user privacy profile, terminating a selected relationship between the user and the application service by selecting a respective persona on listing of the single interface and deactivating the respective persona within the data access agent, wherein, upon deactivating the respective persona on the single interface, the data access agent deletes the respective persona and disables any brokering of the user record information.

14. The computer program product of claim 13, further including an executable portion that:

determines the selected level of anonymity for the unique user privacy profile; and shares the unique user privacy profile with the application service according to the selected level of anonymity.

15. The computer program product of claim 13, further including an executable portion that define the selected level of anonymity to include an email, a name, contact data or a combination thereof.

16. The computer program product of claim 13, further including an executable portion that generate a brokered, anonymous, or actual email, name, demographic, contact data or a combination thereof for the unique user privacy profile according to the selected level of anonymity.

17. The computer program product of claim 13, further including an executable portion that requires a transaction agreement for managing the user data access via the data access agent.

* * * * *